Dec. 31, 1940.  A. M. MARKS  2,226,568
PROCESS FOR MANUFACTURING IODOALKALOIDS
Filed Dec. 11, 1937  2 Sheets-Sheet 2
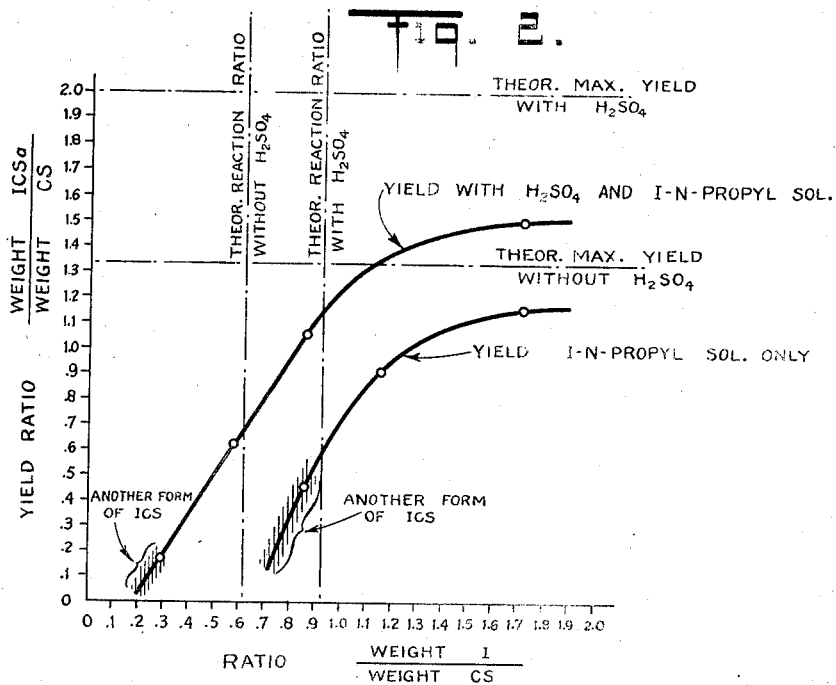
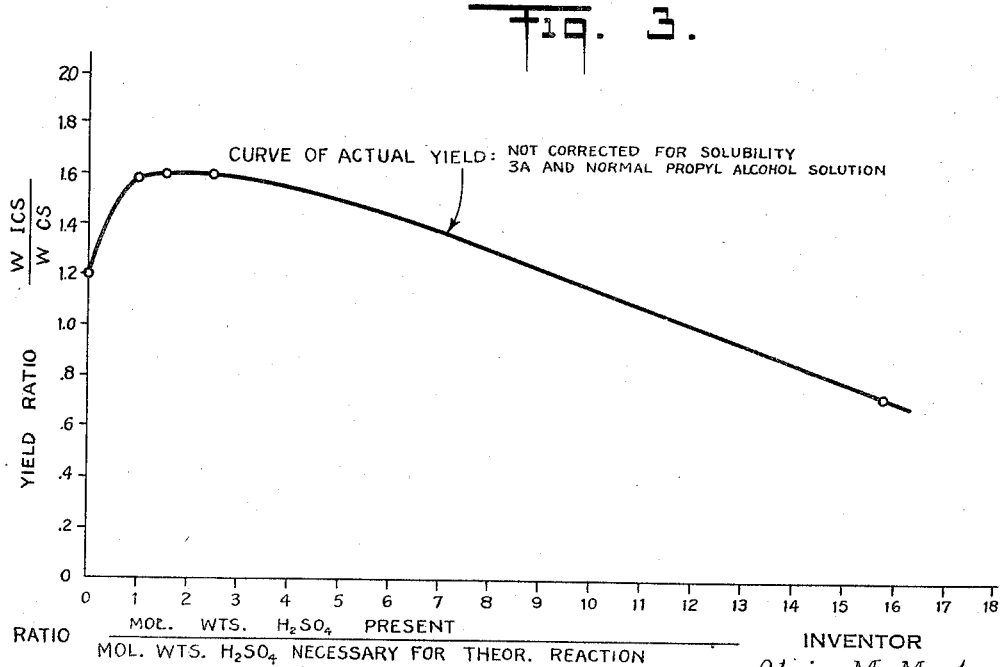

Patented Dec. 31, 1940

2,226,568

UNITED STATES PATENT OFFICE 2,226,568

PROCESS FOR MANUFACTURING IODO-ALKALOIDS

Alvin M. Marks, Whitestone, N. Y.

Application December 11, 1937, Serial No. 179,297

15 Claims. (Cl. 260—284)

This invention pertains to the manufacture of iodoalkaloids.

One of the objects of the invention is to provide an improved method of manufacturing iodocinchonidine sulphate. Other objects will be in part obvious and in part pointed out hereinafter.

This application is a continuation-in-part of my co-pending application Serial No. 662,090, filed March 22, 1933 issued January 11, 1938 as Patent No. 2,104,949.

In the accompanying drawings:

Figure 2 is a graph showing the effect of the presence of certain substances in a reaction solution; and Figure 3 is a graph showing the effect of sulphuric acid on the yield of iodocinchonidine sulphate.

Figure 1:
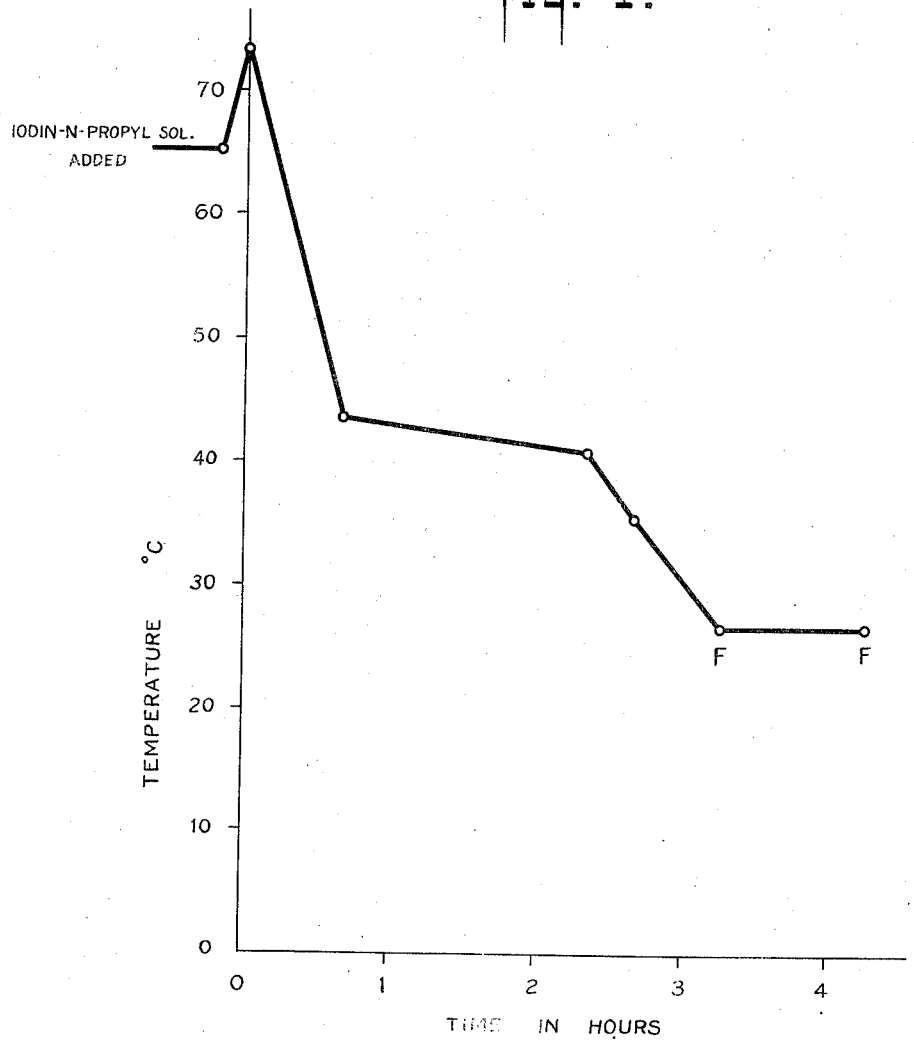
Figure 1 is a graph of a temperature curve followed in cooling a reaction solution used in one of the embodiments of my invention.

Although the embodiments chosen to illustrate the invention deal with the manufacture of iodocinchonidine sulphate, processes embodying the invention are applicable to the manufacture of other iodoalkaloid compounds.

Iodocinchonidine sulphate apparently may exist in several forms. One form, which I call iodocinchonidine sulphate-a, generally exists in the crystalline stage in flat, almost symmetric crystals having hexagonal or other faces derived from an approximately 44° rhombic crystal. When iodocinchonidine sulphate is used as a light polarizing medium as described in said copending application, it is this form that is usually the most desirable since its extinction color when used as an analyzer for polarized light is practically black, and its color for parallel transmission is practically colorless. Its reflection color is golden.

Another form, which I term iodocinchonidine sulphate-b, generally exists in the crystalline stage in relatively long, flat, ribbon-like crystals. When used as an analyzer for polarized light, its extinction color is substantially black, and its color for parallel transmission is practically colorless. Its reflection color is dull dark green.

Another form, which I call iodocinchonidine sulphate-c, exists in the crystalline stage in long, thin, needle- or thread-like crystals. This crystal, when used as an analyzer for polarized light, is colorless for parallel transmission, and is red when crossed. In the bulk, and wet with alcohol, it forms a maroon-brown fluffy mass similar in appearance to colored wet absorbent cotton in water.

Another form, which I call iodocinchonidine sulphate-d, exists in the crystalline shape in flat crystals, needles, ribbons, or elongated plate-like crystals. The crystals are colorless when used as an analyzer for parallel transmission, and transmit a weak yellow color when used as an analyzer and crossed to the plane of polarization. Its reflection color is tan.

Still another form I call iodocinchonidine sulphate-e is an amorphous tarry substance and apparently forms only when the percentage of water is high in the solution in which it is formed.

Iodocinchonidine sulphate-a in some solutions, and under various conditions of temperature and concentrations of components that may be present in the solution, changes to these other forms of iodocinchonidine sulphate; hence, in manufacturing iodocinchonidine sulphate-a, care must be taken to prevent the formation of these less desired forms.

Several processes of forming iodocinchonidine sulphate-a are known to the art, but they have numerous disadvantages and are not useful for efficient commercial production. One of these known processes was devised by Herapath and described in Philosophical Magazine of 1854, pages 130 to 154. But the Herapath method had such disadvantages as requiring a long time for crystals of the iodocinchonidine sulphate-a to form, and producing undesired forms of iodocinchonidine sulphate.

Another process of forming iodocinchonidine sulphate-a (called first cinchonidine sulphate periodide by Jorgensen) is described by S. M. Jorgensen in his article "About the so-called Herapathite and similar acid periodides" in Communications to the Royal Academy of Science, series 5, Division of Natural Science and Mathematics, volume 12, No. 1, of 1875, pages 67 through 70, in which process Jorgensen makes a solution in "hot alcohol" of cinchonidine, hydroiodic acid, sulphuric acid, iodine, and water, in the calculated reaction quantities based on the analytic formula of iodocinchonidine sulphate-a. In a modified solution, he specifies using three-fourths of the calculated reaction quantity of hydrogen iodide. But this process has the disadvantage, as described by Jorgensen, of forming forms of iodocinchonidine sulphate other than those desired.

An embodiment of one modification of the invention is described in the said copending application. The method therein described for preparing iodocinchonidine sulphate-a is as follows:

A solution of cinchonidine sulphate is made up in the following proportions:

| | Percent by weight |
|---|---|
| Distilled water | 51.2 |
| Sulphuric acid, sp. gr. 1.84 | 7.4 |
| Normal propyl alcohol | 35.6 |
| Cinchonidine sulphate | 5.8 |

For purposes of description, this solution will be designated as solution No. 1—a.

Next a solution of iodine in normal propyl alcohol is made in the following proportions:

| | Percent by weight |
|---|---|
| Iodine | 17.1 |
| Normal propyl alcohol | 82.9 |

This is prepared by heating and agitating the solution till the iodine dissolves. These proportions give a relatively concentrated solution of iodine which when added to solution No. 1—a in the amount necessary to add the required amount of iodine, does not appreciably dilute solution No. 1—a with alcohol. For purposes of description, this solution will be referred to as No. 2—a.

*First cycle*

Solutions Nos. 1—a and 2—a are combined in such amounts as to give a reaction solution having the following proportions:

| | Percent by weight |
|---|---|
| Water | 50.0 |
| Sulphuric acid | 7.33 |
| Normal propyl alcohol | 36.4 |
| Cinchonidine sulphate | 5.68 |
| Iodine | 0.309 |

The combining of the solutions is preferably carried out by adding solution No. 2—a to solution No. 1—a, while stirring. With these proportions, the ingredients react to form iodocinchonidine sulphate.

The resulting solution is at first a clear deep amber color, but as it stands (with agitation), minute straw-tan colored crystals form and thicken the solution to a sludge.

To this sludge distilled water is added, bringing the percent water by weight to 76%. The sludge takes on a yellow-tan color. This mixture is now preferably heated to about 60° C., while stirring, to dissolve the crystals to obtain a clear deep amber solution.

The solution is cooled and at about 48° C. fine crystals begin to form. At 36° to 32° C. a relatively large percent of the iodocinchonidine sulphate present has crystallized out. These crystals are what I have referred to as iodocinchonidine sulphate-a. If, during the cooling, the solution suddenly turns a murky brown, it may be cleared by stirring.

The crystalline precipitate is now preferably filtered under suction while the solution is maintained between 32° and 36° C. A better yield may be obtained if the filtering is carried out between 28° and 26° C. but I have found there is a tendency for another form of iodocinchonidine sulphate to precipitate out if the solution is allowed to stand or be filtered at these temperatures. Thus, when filtering between 26° and 28° C., precaution should be taken to avoid the formation of other forms of iodocinchonidine sulphate.

The filtered iodocinchonidine sulphate-a is drained of as much of the filtrate as possible by mechanical means and then dried at room temperature. With this procedure a yield of iodocinchonidine sulphate is obtained which is 88% by weight of the possible theoretical yield, based on the amount of iodine added.

*Second cycle*

The iodocinchonidine sulphate in this yield is less than 10% of the cinchonidine used so that the greater percentage of the cinchonidine sulphate still remains in the filtrate which, for purposes of description, will be called solution No. 3—a. About the same amount of solution No. 2—a is added to solution No. 3—a, and cinchonidine sulphate is added in an amount about equal to the amount of cinchonidine sulphate removed by the crystal precipitate.

A dark green fine precipitate forms which dissolves at 73° C. forming a clear deep amber solution. A dark material (another form of iodocinchonidine sulphate) also forms, probably because of the high amount of water present, and collects upon stirring at the bottom. The supernatant liquid is then decanted. As the decanted liquid is cooled, the iodocinchonidine sulphate-a begins to crystallize out at about 48° C. The solution is further cooled and filtered as before and the crystals are dried. The yield in this cycle is also high when computed on the amount of iodine added. In carrying out subsequent cycles, the initial proportion of cinchonidine sulphate to iodine is maintained substantially constant.

The presence of normal propyl alcohol as one of the ingredients of the reaction solution aids in causing the cinchonidine sulphate and the iodine to combine more rapidly to form iodocinchonidine sulphate. I believe that the reaction is thus speeded up by a reaction between the iodine and normal propyl alcohol which forms hydrogen iodide which then reacts with the cinchonidine sulphate, free iodine, sulphuric acid, and water to form iodocinchonidine sulphate-a.

While the modification of my invention just described has certain advantages, such as causing the reaction to proceed rapidly, the following modification has certain additional advantages. In this second modification of my invention, the following solution is made up:

| | Percent by weight |
|---|---|
| Water | 16.4 |
| 3—A ethyl alcohol | 82.8 |
| Sulphuric acid | .102 |
| Cinchonidine sulphate | .752 |

(By 3—A ethyl alcohol I refer to the United States standard for especially denatured alcohol as specified by the Alcohol Tax Department of the United States Treasury.) The solution is heated to approximately 65° C. to dissolve the cinchonidine sulphate and to raise the solution above the crystallizing temperature of the iodocinchonidine sulphate-a to be formed. This will be referred to as solution No. 1—b.

Also a solution of iodine in normal propyl alcohol is made up in the following proportions:

| | Percent by weight |
|---|---|
| Iodine | 17.1 |
| Normal propyl alcohol | 82.9 |

The iodine is dissolved as in solution No. 2—a by heating the solution which may then be cooled. This solution will be referred to as No. 2—b.

First cycle

While solution No. 1—*b* is maintained at about 65° C., an amount of solution No. 2—*b* is added to an amount of the solution No. 1—*b* sufficient to give a reaction solution having the following proportions:

| | Percent by weight |
|---|---|
| Water | 14.87 |
| 3—A ethyl alcohol | 75.1 |
| Normal propyl alcohol | 7.98 |
| Cinchonidine sulphate | .682 |
| Iodine | 1.364 |
| Sulphuric acid | .0927 |

Note that the proportion of 3—A ethyl alcohol to the normal propyl alcohol is about ten to one. This proportion of normal propyl alcohol is sufficient to react with a portion of the iodine present to convert it to hydrogen iodide and to maintain a sufficient concentration of this hydrogen iodide to react with the cinchonidine sulphate and other ingredients to form iodocinchonidine sulphate-a without, however, ever raising the concentration of the hydrogen iodide sufficiently to interfere with the formation of the iodocinchonidine sulphate-a or to interfere with the crystallization of the iodocinchonidine sulphate-a. Further, iodocinchonidine sulphate-a is not unstable in this solution even at the lower temperatures.

The solution is kept above the crystallization temperature of the iodocinchonidine sulphate-a during the mixing and then is cooled rapidly at a controlled rate as shown in the graph of Figure 1. The initial rapid cooling reduces the length of time at which the solution is at such temperatures as are favorable to the formation of compounds other than iodocinchonidine sulphate-a. The cooling is stopped when the temperature reaches about 44° to 42° C. and this temperature is held approximately for as long as one and a half hours. The temperature for this repose is selected slightly below the temperature at which the crystals start to appear during cooling. During this period of repose, nuclei of iodocinchonidine sulphate-a form and grow to relatively large crystals containing little or no impurities. Thereafter the cooling is again commenced with causes the crystals that have already formed to become still larger without, however, causing appreciable formation of additional nuclei and small crystals. This cooling is also carried on at a controlled rate as shown in Figure 1, but somewhat slower than the first cooling so as not to force the crystallization too much. The cooling is continued to as low a temperature as convenient.

Then the solution is filtered under suction after sufficient time has elapsed (for example, one half hour) for approximately all the iodocinchonidine sulphate to crystallize out that will at the temperature at which the filtering is carried out.

The crystal yield obtained is about 80% of the theoretical yield based on the amount of cinchonidine sulphate used.

Of course, some iodocinchonidine sulphate-a remains in solution in the filtrate. Greater efficiency of operation may, therefore, be obtained by repeating the cycle in the following manner.

Second cycle

The filtrate, which will be called for purposes of description No. 3—*b*, is heated to about 65° C. at which temperature any nuclei of iodocinchonidine sulphate-a which may have been present in the filtrate dissolve. The solution is treated with sufficient amount of solution No. 2—*b* to bring about in the reaction solution the same relative proportions of cinchonidine sulphate, iodine, and sulphuric acid as were present in the reaction solution of the first cycle.

The solution is then cooled and filtered as before.

Additional cycles may be carried out following the second cycle, but care is taken to keep as short as possible the total time at which the temperature of the reaction solution and the filtrate solution No. 3—*b* is maintained at a temperature favorable to the formation of forms of iodocinchonidine sulphate other than iodocinchonidine sulphate-a.

Furthermore, in carrying out these cycles, the initial relative proportions of the components are maintained substantially constant.

Whereas the modifications of the invention as described above may be carried out satisfactorily in the proportions disclosed, certain leeway is permissible in changing the proportions of the ingredients and in the order of mixing them as will now be explained along with a discussion of the advantages of proportions and ingredients.

In the second modification, the iodine is present in the reaction solution in excess of the total amount of iodine necessary to react with the cinchonidine sulphate present. This excess of the iodine, when the other reaction ingredients are present in the desired amount (as will be hereinafter pointed out), forces the reaction to form iodocinchonidine sulphate-a. Furthermore, an excess of iodine aids in increasing the yield of iodocinchonidine sulphate-a (based on the amount of cinchonidine sulphate used) as shown in the graphs of Figure 2. However, the curves show that when the excess of iodine is increased beyond a certain amount, no further increase in the yield is obtained.

In the second modification, wherein the cinchonidine sulphate is used in much less concentrated amount than in the first modification, its concentration relation to the solvent may be increased (with similar increase in the other reaction components) to increase the concentration of the iodocinchonidine sulphate-a in the final solution, and, in doing this, the total yield of the iodocinchonidine sulphate-a is also increased. However, the proportions of cinchonidine sulphate as disclosed in the second modification are satisfactory for commercial production.

As already briefly pointed out, the iodine that reacts with the cinchonidine sulphate is in two forms, one hydrogen iodide and the other free iodine. The presence of hydrogen iodide in the solution in excess of that required for the formation of iodocinchonidine-a, so increases the solubility of the iodocinchonidine sulphate-a as to materially interfere with the quantity crystallized, and so reduces the ratio of the actual to the theoretical yield. Likewise, if an insufficient amount of hydrogen iodide is present, this also interferes with obtaining the maximum yield by not permitting the reaction to go to completion. However, iodine and normal propyl alcohol apparently react to form hydrogen iodide in accordance with a reversible reaction which maintains, at all times, a concentration of hydrogen iodide present which is favorable to the formation of iodocinchonidine sulphate-a and which also is not unfavorable to the crystallizing out of the maximum yield. Thus, with iodine present in excess, as above pointed out, the presence of normal propyl alcohol (providing other ingredients are present in the desired amounts) acts to insure the reaction's proceeding in the manner desired to produce iodocinchonidine sulphate-a.

As described in the first modification, the entire process can be carried out using normal propyl alcohol and water as the only solvent. However, as a solvent, it has the disadvantages of not dissolving as much iodocinchonidine sulphate as does ethyl alcohol. Further, normal propyl alcohol is a more costly solvent than 3—A. So, for the most part, the 3—A ethyl alcohol can be substituted for normal propyl alcohol. When this is done, the amount of normal propyl alcohol used need be only that sufficient to bring about the desired rate of reaction between the iodine and the cinchonidine sulphate.

In the second modification, I have disclosed the method of dissolving the iodine in the normal propyl alcohol and the cinchonidine sulphate in the 3—A ethyl alcohol. Although the iodine could be dissolved in the 3—A ethyl alcohol and the desired amount of normal propyl alcohol could then be added to the reaction solution or to the 3—A ethyl alcohol solution of cinchonidine sulphate, the reaction proceeds more rapidly if the iodine is dissolved in the concentrated normal propyl alcohol. This concentration, however, is made as high as practical to avoid adding more normal propyl alcohol than is necessary to obtain the desired reaction rate.

By substituting 3—A ethyl alcohol for most of the solvent used in the first modification, it is possible to have a higher concentration of iodocinchonidine sulphate-a in the final reaction solution than is possible with the solvent used in the first modification. Furthermore, there is less tendency for other forms of iodocinchonidine sulphate to form at the lower temperatures and, consequently, the solution may be filtered at any convenient low temperature and the ratio of the actual to the theoretical yield is thus increased. Further, the present cost of the 3—A solution in the second modification is much less than that of the normal propyl alcohol solution for the same resulting yield.

If hydrogen iodide is present in the reaction solution in an amount required for the reaction, and if an excess of iodine is present, the reaction proceeds favorable to the formation of iodocinchonidine sulphate-a. Thus, in accordance with a third modification of my process, the following reaction solution is prepared:

| | Percent by Weight |
|---|---|
| 3—A ethyl alcohol | 81.3 |
| Water | 17.2 |
| Sulphuric acid | 0.201 |
| Cinchonidine sulphate | 1.48 |

For purposes of description, this solution will be referred to as No. 1—c. Another solution is prepared in the following proportions:

| | Percent by Weight |
|---|---|
| 3—A ethyl alcohol | 81.9 |
| Water | 15.7 |
| Hydrogen iodide | .349 |
| Iodine | 2.95 |

This solution will be referred to, for purposes of description, as No. 2—c.

Both solutions are heated to approximately 65° C. and are combined in equal parts. The solution is then rapidly cooled until crystals start to appear (at approximately 42°) and a cooling curve similar to that shown in Figure 1 is followed in cooling the solution to the temperature at which it is filtered as before.

The presence of the iodine in excess in this modification prevents the formation of the undesired forms of iodocinchonidine sulphate.

The advantage of the presence of some sulphuric acid in the second modification is shown by the following equation, which is representative of the reaction proportions (and combining weights) between the cinchonidine sulphate and iodine:

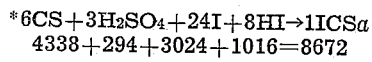
$$*6CS + 3H_2SO_4 + 24I + 8HI \rightarrow 11ICSa$$
$$4338 + 294 + 3024 + 1016 = 8672$$

(Approximate combining weights)

This shows that the presence of sulphuric acid is necessary to allow the reaction between the cinchonidine sulphate and iodine present to go to completion. Otherwise the following reaction takes place:

$$*18CS + 48I + 16HI \rightarrow 2ICSa + 12 \text{ cinchonidine}$$

However, if the amount of sulphuric acid used is increased over and above that required for the reaction (plus an excess), the solubility of the iodocinchonidine sulphate-a in the reaction solution is increased and the ratio of the actual to the theoretical yield is reduced. This is shown in the graph in Figure 3, which shows how the yield is decreased as the proportion of sulphuric acid is increased. Consequently the production is preferably carried out with an amount of sulphuric acid present to produce a maximum yield.

The reaction solution contains water which apparently aids in the formation of larger iodocinchonidine sulphate-a crystals. Thus, the presence of water in at least 14% by weight reduces the number of crystal nuclei that form during crystallization with the result that the crystals of iodocinchonidine sulphate-a obtained are larger. However, if the percentage of water present is increased to 76% by weight, then another type of iodocinchonidine sulphate tends to form, as is pointed out in the description of the first modification. Thus, the amount of water present may be varied to some extent to produce the result most desirable to the process as it is being carried out.

As various embodiments might be made of this invention, and as various changes might be made in the construction herein described, all without departing from the scope of the invention, it is to be understood that all matters herein set forth or shown in the accompanying drawings is to be interpreted as illustrative and not in a limiting sense.

I claim:

1. Method of manufacturing iodocinchonidine sulphate, comprising, the steps of dissolving cinchonidine sulphate in an alcohol solution, dissolving iodine in an alcohol solution, at least one of said solution solvents containing normal propyl alcohol, combining the solutions and maintaining the reaction solutions at a temperature at which no iodocinchonidine sulphate crystallizes out to allow the cinchonidine sulphate and iodine to react, and then cooling the reaction solution to cause the iodocinchonidine sulphate to crystallize out.

2. Method of manufacturing iodocinchonidine

---

*In the equations:
 CS—cinchonidine sulphate
 ICSa—iodocinchonidine sulphate-a sulphate, comprising, the steps of dissolving cinchonidine sulphate in an alcohol solution, dissolving iodine in an alcohol solution, at least one of said solution solvents containing normal propyl alcohol, combining the solutions and maintaining the reaction solutions at a temperature at which no iodocinchonidine sulphate crystallizes out to allow the cinchonidine sulphate and iodine to react, then cooling the reaction solution to cause the iodocinchonidine sulphate to crystallize out, filtering the solution to separate out the crystallized iodocinchonidine sulphate, reheating the solution and adding cinchonidine sulphate and iodine in amounts substantially to preserve the original relative proportions, again heating the solution to permit the chemical reaction to take place without crystallization and again cooling to cause crystallization of the iodocinchonidine sulphate and repeating the cycle as many times as desired.

3. The method of manufacturing iodocinchonidine sulphate, comprising, dissolving cinchonidine sulphate in a normal propyl alcohol solution, making a relatively concentrated solution of iodine in a normal propyl alcohol solution in the order of 17% by weight of iodine, combining the two solutions and cooling the solutions sufficiently to cause crystallization of the iodocinchonidine sulphate therefrom.

4. The method of manufacturing iodocinchonidine sulphate, comprising, dissolving cinchonidine sulphate in a solution of water and normal propyl alcohol, dissolving iodine in a solution of normal propyl alcohol, combining the two solutions and heating them to a temperature sufficiently high to cause the reaction to complete itself without the crystallization of iodocinchonidine sulphate, and subsequently cooling the solution to a temperature of 32° C. to cause the iodocinchonidine sulphate to crystallize therefrom.

5. Process of manufacturing iodocinchonidine sulphate, comprising, the steps of, dissolving cinchonidine sulphate in an alcoholic solution, dissolving iodine in a solution of normal propyl alcohol, combining the solutions in the presence of water and heating the solution thus formed to a temperature above the crystallization point of the iodocinchonidine sulphate whereby the reaction completes itself rapidly without crystallization and subsequently cooling the solution to cause the iodocinchonidine sulphate to crystallize out, but stopping the cooling at about 32° C. whereby the iodocinchonidine sulphate crystallizes out in the desired form.

6. Process of manufacturing iodocinchonidine sulphate, comprising, the steps of dissolving cinchonidine sulphate in ethyl alcohol, dissolving iodine in normal propyl alcohol, combining the solutions and lowering the temperature sufficiently to cause the iodocinchonidine sulphate to crystallize out.

7. The process for manufacturing iodocinchonidine sulphate, comprising, the steps of making a solution of cinchonidine sulphate in ethyl alcohol and water, making a solution of iodine and normal propyl alcohol and combining the solutions in such proportions that the amount of iodine present is greater than that necessary to react with the cinchonidine sulphate to form iodocinchonidine sulphate.

8. Method of manufacturing iodocinchonidine sulphate, comprising, the steps of dissolving cinchonidine sulphate in a solution of ethyl alcohol and water, dissolving iodine in normal propyl alcohol and combining the two solutions, heating the combined solution sufficiently for the action to complete itself without the crystallization of iodocinchonidine sulphate, and subsequently lowering the temperature to cause the iodocinchonidine sulphate to crystallize out, the concentration of cinchonidine sulphate in its original solution being in the order of one part by weight cinchonidine sulphate to 109 parts by weight of ethyl alcohol and the concentration of iodine in its original solution being in the order of one part by weight of iodine to five parts by weight of normal prophyl alcohol, these concentrations being such that the iodocinchonidine sulphate formed from the concentration of the solvents is just saturated at about 44° C.

9. The method of manufacturing iodocinchonidine sulphate by combining separate solutions of cinchonidine sulphate and iodine, comprising the steps of, dissolving cinchonidine sulphate in a solution comprising ethyl alcohol and water to a concentration sufficient to cause the concentration of the iodocinchonidine sulphate in solution to start crystallizing out at about 44° C., dissolving iodine in a normal propyl alcohol solution to make a relatively concentrated solution thereof, adding a sufficient amount of the iodine solution to the cinchonidine sulphate solution to make the ratio of iodine to cinchonidine sulphate greater than the theoretical amount of iodine necessary to combine with the amount of cinchonidine sulphate present to form iodocinchonidine sulphate, heating the combined solutions to a temperature at which the reaction completes itself without crystallizing out iodocinchonidine sulphate, rapidly cooling the solution to a point where the iodocinchonidine sulphate is supersaturated to allow it to crystallize out, then slowly cooling the solution to permit the crystals of iodocinchonidine sulphate to grow slowly and continuing the cooling until the solution is sufficiently depleted of iodocinchonidine sulphate and filtering it to remove the iodocinchonidine sulphate.

10. Process for manufacturing iodocinchonidine sulphate, comprising the steps of, dissolving cinchonidine sulphate in ethyl alcohol and water, dissolving iodine in normal propyl alcohol, and combining the solutions, the concentration of the cinchonidine sulphate and the iodine being such that the iodocinchonidine sulphate formed by the reaction is supersaturated below 44° C. and the amount of water present being between 14% and 60% by weight to prevent the formation of a large proportion of nuclei upon reducing the temperature of the solution to a point where the iodocinchonidine sulphate starts crystallizing out.

11. The process of manufacturing iodocinchonidine sulphate, comprising, the steps of, dissolving cinchonidine sulphate in ethyl alcohol, making a concentrated solution of iodine and normal propyl alcohol, and combining the solutions to permit the formation of iodocinchonidine sulphate.

12. That step in the manufacture of iodocinchonidine sulphate-a comprising causing cinchonidine sulphate to react with sulphuric acid in slight excess, water, and hydrogen iodide present in approximately the theoretical reaction proportion in an ethyl alcohol solution and with an excess of iodine.

13. In the process of manufacturing iodocinchonidine sulphate, the step of causing the cinchonidinesulphate to react with the iodine in the presence of normal propyl alcohol and an excess of iodine.

14. In the process of manufacturing iodocinchonidine sulphate-a from cinchonidine sulphate and iodine, the step of causing the reaction ingredients to combine in the presence of normal propyl alcohol.

15. That step in the manufacture of iodocinchonidinesulphate-a comprising causing cinchonidinesulphate to react with sulphuric acid in slight excess of the theoretical reaction amount, water, and hydrogen iodide present in approximately the theoretical reaction proportion in a solvent alcohol solution and with an amount of iodine in excess of the theoretical reaction.

ALVIN M. MARKS.